United States Patent
Chen

(10) Patent No.: US 9,140,904 B2
(45) Date of Patent: Sep. 22, 2015

(54) LIGHT EMITTING DEVICE AND BACKLIGHT MODULE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 89 days.

(21) Appl. No.: 14/014,304

(22) Filed: Aug. 29, 2013

(65) Prior Publication Data

US 2014/0293579 A1    Oct. 2, 2014

(30) Foreign Application Priority Data

Apr. 2, 2013  (TW) .............................. 102111845 A

(51) Int. Cl.
 *F21V 13/02*     (2006.01)
 *G02B 27/10*     (2006.01)
 *G02B 19/00*     (2006.01)

(52) U.S. Cl.
 CPC .......... *G02B 27/102* (2013.01); *G02B 19/0014* (2013.01); *G02B 19/0057* (2013.01)

(58) Field of Classification Search
 CPC ........... F21V 13/02; F21V 5/04; F21V 13/12; G02B 27/10; G02B 27/1026; G02B 27/102; H01S 3/00; H01S 3/0071
 See application file for complete search history.

(56) References Cited

U.S. PATENT DOCUMENTS

| | | | |
|---|---|---|---|
| 5,556,189 A  * | 9/1996 | Wallis ......................... | 362/153.1 |
| 8,456,588 B2 * | 6/2013 | Shikii et al. ...................... | 349/62 |
| 2004/0042085 A1* | 3/2004 | Hough ........................... | 359/619 |
| 2013/0016305 A1* | 1/2013 | Kaneda ........................... | 349/61 |
| 2013/0215397 A1* | 8/2013 | Matsubara ...................... | 353/57 |

* cited by examiner

*Primary Examiner* — Bao Q Truong

(74) *Attorney, Agent, or Firm* — Novak Druce Connolly Bove + Quigg LLP

(57) ABSTRACT

A light emitting device includes a laser light source, a converging lens, and a diverging lens. The laser light source is configured to emit combined red, green, and blue laser beams. The combined red, green, and blue laser beams appear to be collimated white light beams. The converging lens is configured to receive the collimated white light beams. The diverging lens faces the converging lens and is configured to diverge the collimated white light beams exiting from the converging lens. A distance between the diverging lens and the converging lens is larger than the focal length of the converging lens.

15 Claims, 4 Drawing Sheets

LIGHT EMITTING DEVICE AND BACKLIGHT MODULE

BACKGROUND

1. Technical Field

The present disclosure relates to light sources and, particularly, to a light emitting device and a backlight module.

2. Description of Related Art

A backlight module emitting approximate white light is needed to illuminate a liquid crystal display (LCD) device to display actual images. The backlight module is used to convert linear light sources such as cold cathode ray tubes, or point light sources such as light emitting diodes (LEDs), into area light sources having high uniformity and brightness.

If the LEDs are introduced as point light sources to the backlight module; the LEDs usually excite and mix specific phosphor powder packed with LED chips to emit the approximate white light. However, the color and the gamut of the approximate white light are too weak.

Therefore, it is desirable to provide a light emitting device and a backlight module having the light emitting device, which can overcome or at least alleviate the above-mentioned problems.

DETAILED DESCRIPTION

Figure 1:
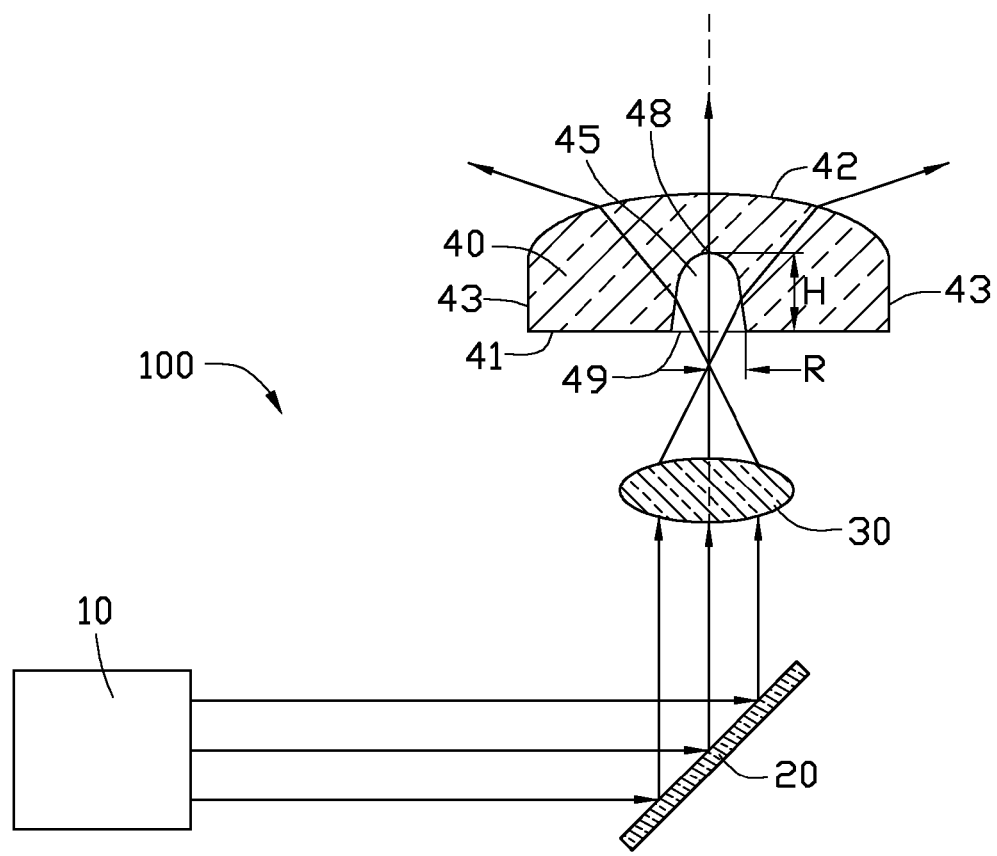
FIG. 1 is a schematic view of a light emitting device including a laser light source, according to a first exemplary embodiment.

FIG. 1 shows a light emitting device 100 according to a first exemplary embodiment. The light emitting device 100 includes a laser light source 10, a reflecting mirror 20, a converging lens 30, and a diverging lens 40.

Figure 2:
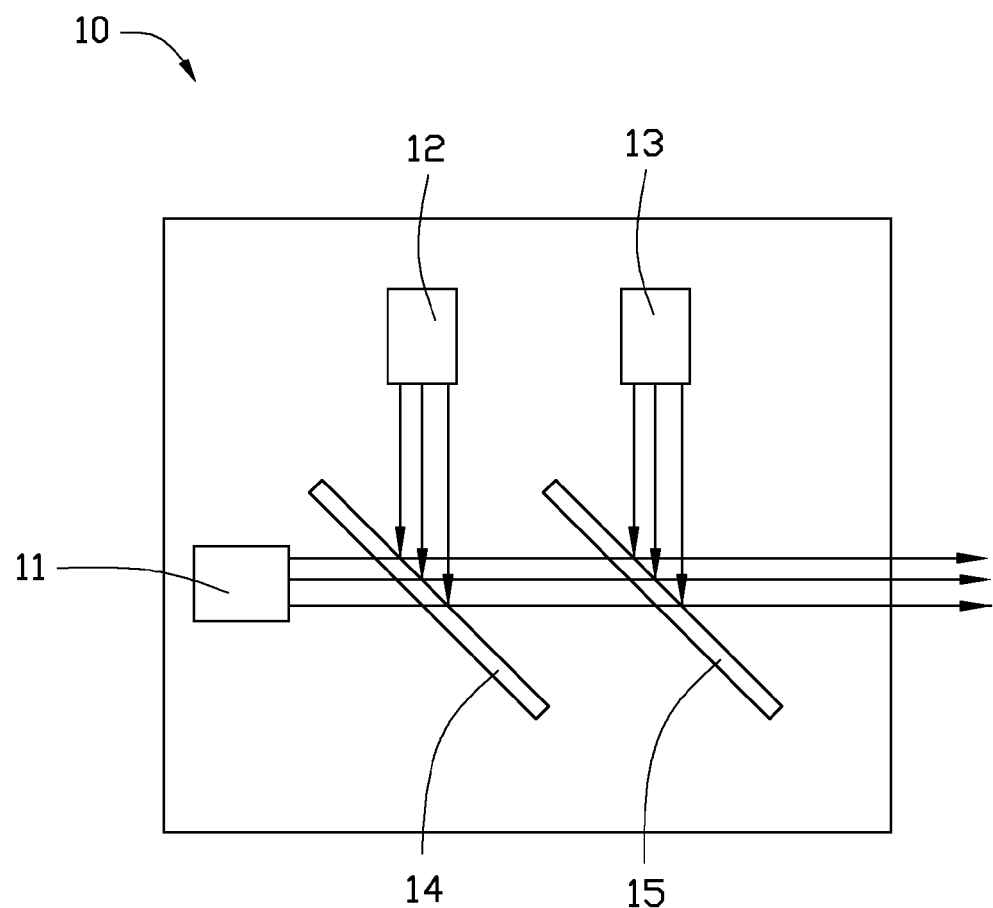
FIG. 2 is a schematic view of the laser light source of FIG. 1.

The laser light source 10 is configured to emit combined red, green, and blue laser beams. The combined red, green, and blue laser beams appear to be collimated white light beams. In detail, FIG. 2 shows that the laser light source 10 includes a first laser unit 11, a second laser unit 12, a third laser unit 13, a first dichroic mirror 14, and a second dichroic mirror 15. The first laser unit 11 is configured to emit green laser beams. The second laser unit 12 is configured to emit red laser beams. The third laser unit 13 is configured to emit blue laser beams.

The first laser unit 11, the second laser unit 12, and the third laser unit 13 are arranged in an L-shaped line. In detail, the second laser unit 12 and the third laser unit 13 are arranged in a straight line, and the first laser unit 11 is located on a line which is perpendicular to the straight line. That is, the blue laser beams is parallel with the red laser beams and is perpendicular to the green laser beams. The first dichroic mirror 14 and the second dichroic mirror 15 are arranged in a line on a light path of the first laser unit 11. The first dichroic mirror 14 corresponds to the second laser unit 12, and the second dichroic mirror 15 corresponds to the third laser unit 13.

The green laser beams emitting from the first laser unit 11 passes through the first dichroic mirror 14 and the second dichroic mirror 15. The red laser beams emitting from the second laser unit 12 are reflected toward the second dichroic mirror 15 by the first dichroic mirror 14, and then pass through the second dichroic mirror 15. The blue laser beams emitting from the third laser unit 13 are reflected by the second dichroic mirror 15. The green, red, and blue laser beams passing through the second dichroic mirror 15 are mixed to form the collimated white light beams.

In this embodiment, each of the first laser unit 11, the second laser unit 12, and the third laser unit 13 is a semiconductor laser device which is smaller than any other kind of laser device. Accordingly, the laser light source 10 and the light emitting device 100 are miniaturized.

The reflecting mirror 20 is arranged on a light path of the laser light source 10. The reflecting mirror 20 is configured to receive and reflect the collimated white light beams. In this embodiment, the collimated white light beams from the laser light source 10 is rotated about 90 degrees to reach the converging lens 30. In other embodiments, the reflecting mirror 20 can be omitted, and the collimated white light beams from the laser light source 10 directly enters the converging lens 30.

The converging lens 30 faces the reflecting mirror 20. The diverging lens 40 and the reflecting mirror 20 are positioned at opposite sides of the converging lens 30, and the diverging lens 40 is aligned with the converging lens 30. The diverging lens 40 is positioned outside the focal point of the converging lens 30. The diverging lens 40 is made of polycarbonate, polymethyl methacrylate or glass. The diverging lens 40 is symmetric relative to an optical axis thereof. The optical axis is coincided with an optical axis of the converging lens 30.

The diverging lens 40 includes a light incident surface 41, a light output surface 42, and a peripheral surface 43. The light incident surface 41 and the light output surface 42 are positioned at opposite sides of the diverging lens 40. The peripheral surface 43 is interconnected between the light incident surface 41 and the light output surface 42. The light incident surface 41 is a planar surface and faces the converging lens 30. The light incident surface 41 defines a cavity 45 having a semi-elliptic section. The cavity 45 includes a peak 48 at the top and a circular opening 49 at the light incident surface 41. The cavity 45 is symmetric relative to the optical axis. The peak 48 and a center of the opening 49 are positioned on the optical axis. In this embodiment, a distance H between the peak 48 and the opening 49 is larger than the radius of the opening 48 such that the light beams can be more diverged by the diverging lens 40 and be deflected away the optical axis. In other words, a depth of the cavity 45 is larger than the radius of the opening 48. The light output surface 42 is a curved surface and is outward. A frosted region is formed on the peripheral surface 43 by a sandblasting process or an electro-discharge machining process. The frosted region is configured for making the collimated white light beams more uniform.

When in use, the c collimated white light beams from the laser light source 10 is reflected by the reflecting mirror 20 toward the converging lens 30, and then becomes divergent collimated white light beams. The divergent collimated white light beams passes through the light incident surface 41 to enter the diverging lens 40, and exits through the light output surface 42 and the peripheral surface 43 to become more diverged relative to the optical axis. Since the collimated white light beams is mixed by red, green, and blue light beams, the color of the white light is bright, and the gamut of the white light is wide.

Figure 3:
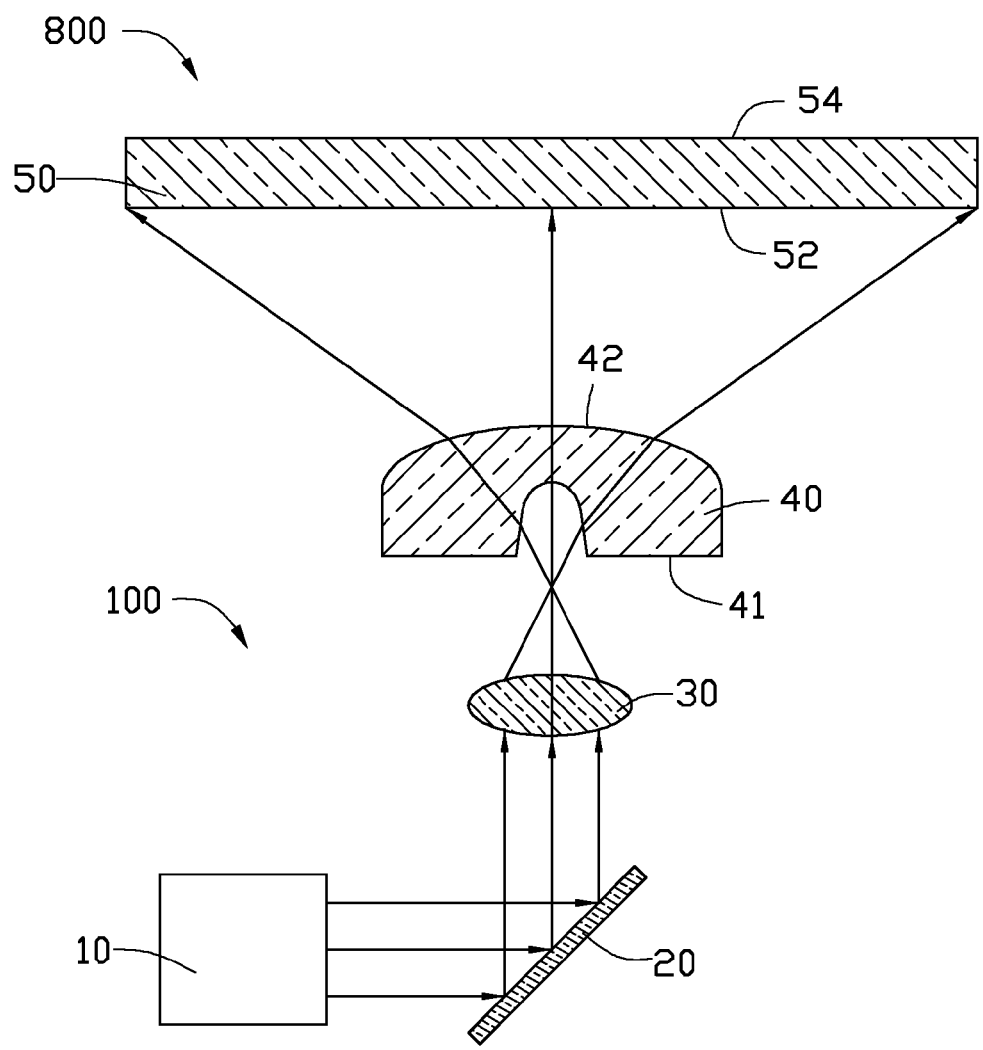
FIG. 3 is a schematic view of a backlight module, according to a second exemplary embodiment.

FIG. 3 shows a backlight module 800 according to a second exemplary embodiment. The backlight module 800 includes the light emitting device 100 of the first embodiment and a diffusion plate 50. The diffusion plate 50 and the converging lens 30 are positioned at opposite sides of the diverging lens 40, and the diffusion plate 50 faces the diverging lens 40. In detail, the diffusion plate 50 includes a first surface 52 and a second surface 54. The first surface 52 and the second surface 54 are positioned at opposite sides of the diffusion plate 50, and the first surface 52 is substantially parallel to the second surface 54. The first surface 52 faces the light output surface 42 and is substantially parallel to the light incident surface 41. The diverged collimated white light beams exiting through the diverging lens 40 enter the diffusion plate 50 through the first surface 52, and then exit through the diffusion plate 50 through the second surface 54 to become more diverged. The backlight module 800 can be used in a liquid crystal display having a small size.

Figure 4:
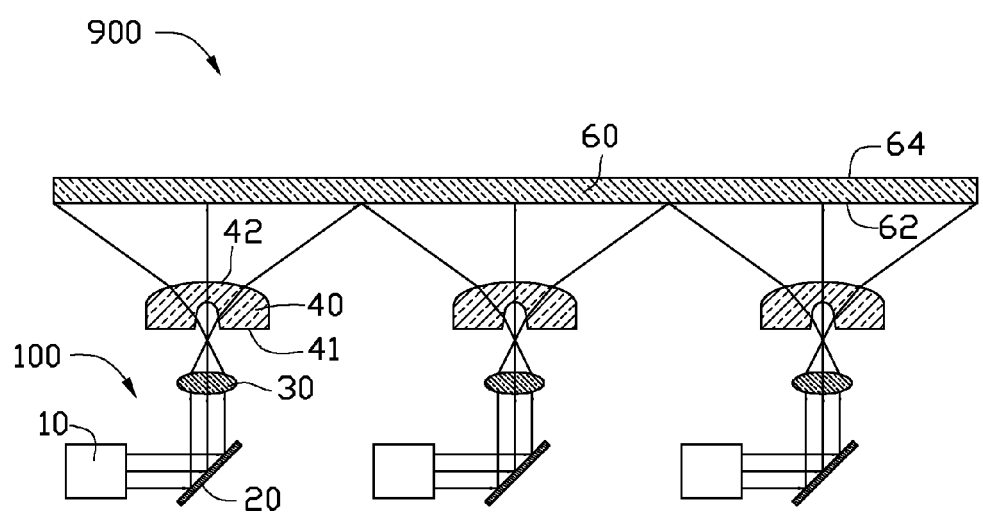
FIG. 4 is a schematic view of a backlight module, according to a third exemplary embodiment.

FIG. 4 shows a backlight module 900 according to a third exemplary embodiment. The backlight module 900 includes a number of light emitting devices 100 of the first embodiment and a diffusion plate 60. The diffusion plate 60 and each of the converging lenses 30 are positioned at opposite sides of each of the diverging lenses 40, and the diffusion plate 60 faces each of the diverging lenses 40. The light emitting devices 100 are spaced apart from each other. In detail, the diffusion plate 60 includes a first outer surface 62 and a second outer surface 64. The first outer surface 62 and the second outer surface 64 are positioned at opposite sides of the diffusion plate 60, and the first outer surface 62 is substantially parallel to the second outer surface 64. The first outer surface 62 faces each of the light output surfaces 42 and is substantially parallel to each of the light incident surfaces 41. The diverged collimated white light beams exiting through the diverging lenses 40 enter the diffusion plate 60 through the first outer surface 62, and then exit through the diffusion plate 60 through the second outer surface 64 to become more diverged. The backlight module 900 can be used in a liquid crystal display having a large size.

Advantages of the backlight module 800 of the second embodiment and the backlight module 900 of the third embodiment are similar to those of the light emitting device 100 of the first embodiment.

Even though numerous characteristics and advantages of the present embodiments have been set forth in the foregoing description, together with detail of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A light emitting device comprising:
 a laser light source configured to emit red, green, and blue laser beams, the red, green, and blue laser beams combining to form a collimated white light beam;
 a converging lens configured to receive the collimated white light beam;
 a diverging lens facing the converging lens and configured to diverge the collimated white light beam exiting from the converging lens, and a distance between the diverging lens and the converging lens being larger than the focal length of the converging lens; and
 a diffusion plate, the diffusion plate and the converging lens positioned at opposite sides of the diverging lens, and the diffusion plate facing the diverging lens.

2. The light emitting device of claim 1, wherein the laser light source comprises a first laser unit for emitting green laser beams, a second laser unit for emitting red laser beams, and a third laser unit for emitting blue laser beams, a first dichroic mirror, and a second dichroic mirror, the blue laser beams being parallel with the red laser beams and perpendicular to the green laser beams, the first dichroic mirror and the second dichroic mirror are arranged on a light path of the first laser unit, the first dichroic mirror corresponds to the second laser unit, the second dichroic mirror corresponds to the third laser unit, green laser beams from the first laser unit passes through the first dichroic mirror and the second dichroic mirror, red laser beams from the second laser unit are reflected toward the second dichroic mirror by the first dichroic mirror and pass through the second dichroic mirror, and blue laser beams from the third laser unit are reflected by the second dichroic mirror.

3. The light emitting device of claim 1, wherein the diverging lens comprises a light incident surface, a light output surface, and a peripheral surface, the light incident surface and the light output surface are positioned at opposite sides of the diverging lens, the peripheral surface is interconnected between the light incident surface and the light output surface, the light incident surface defines a cavity, the light output surface is outwardly curved, and the peripheral surface has a frosted region.

4. The light emitting device of claim 3, wherein the diverging lens is symmetric relative to an optical axis thereof, the cavity is symmetric relative to the optical axis and has a semi-elliptic section, the cavity comprises a circular opening, and a depth of the cavity is larger than the radius of the opening.

5. The light emitting device of claim 1, further comprising a reflecting mirror for receiving and reflecting the collimated white light beams.

6. A backlight module comprising:
 a light emitting device comprising:
  a laser light source configured to emit red, green, and blue laser beams, the red, green, and blue laser beams combining to form a collimated white light beam;
  a converging lens configured to receive the collimated white light beam; and
  a diverging lens facing the converging lens and configured to diverge the collimated white light beam exiting from the converging lens, and a distance between the diverging lens and the converging lens being larger than the focal length of the converging lens; and
  a diffusion plate, the diffusion plate and the converging lens positioned at opposite sides of the diverging lens, and the diffusion plate facing the diverging lens.

7. The backlight module of claim 6, wherein the laser light source comprises a first laser unit for emitting green laser beams, a second laser unit for emitting red laser beams, and a third laser unit for emitting blue laser beams, a first dichroic mirror, and a second dichroic mirror, the blue laser beams being parallel with the red laser beams and perpendicular to the green laser beams, the first dichroic mirror and the second dichroic mirror are arranged on a light path of the first laser unit, the first dichroic mirror corresponds to the second laser unit, the second dichroic mirror corresponds to the third laser unit, green laser beams from the first laser unit passes through the first dichroic mirror and the second dichroic mirror, red laser beams from the second laser unit are reflected toward the second dichroic mirror by the first dichroic mirror and pass through the second dichroic mirror, and blue laser beams from the third laser unit are reflected by the second dichroic mirror.

8. The backlight module of claim 6, wherein the diverging lens comprises a light incident surface, a light output surface, and a peripheral surface, the light incident surface and the light output surface are positioned at opposite sides of the diverging lens, the peripheral surface is interconnected between the light incident surface and the light output surface, the light incident surface defines a cavity, the light output surface is outwardly curved, and the peripheral surface has a frosted region.

9. The light emitting device of claim 8, wherein the diverging lens is symmetric relative to an optical axis thereof, the cavity is symmetric relative to the optical axis and has a semi-elliptic section, the cavity comprises a circular opening, and a depth of the cavity is larger than the radius of the opening.

10. The light emitting device of claim 6, further comprising a reflecting mirror for receiving and reflecting the collimated white light beams.

11. A backlight module comprising:
a number of light emitting devices each comprising:
a laser light source configured to emit red, green, and blue laser beams, the red, green, and blue laser beams combining to form a collimated white light beam;
a converging lens configured to receive the collimated white light beam; and
a diverging lens facing the converging lens and configured to diverge the collimated white light beam exiting from the converging lens, and a distance between the diverging lens and the converging lens being larger than the focal length of the converging lens; and
a diffusion plate, the diffusion plate and each of the converging lenses positioned at opposite sides of each of the diverging lenses, and the diffusion plate facing each of the diverging lenses.

12. The backlight module of claim 11, wherein each of the laser light sources comprises a first laser unit for emitting green laser beams, a second laser unit for emitting red laser beams, and a third laser unit for emitting blue laser beams, a first dichroic mirror, and a second dichroic mirror, the blue laser beams being parallel with the red laser beams and perpendicular to the green laser beams, the first dichroic mirror and the second dichroic mirror are arranged on a light path of the first laser unit, the first dichroic mirror corresponds to the second laser unit, the second dichroic mirror corresponds to the third laser unit, green laser beams from the first laser unit passes through the first dichroic mirror and the second dichroic mirror, red laser beams from the second laser unit are reflected toward the second dichroic mirror by the first dichroic mirror and pass through the second dichroic mirror, and blue laser beams from the third laser unit are reflected by the second dichroic mirror.

13. The backlight module of claim 11, wherein each of the diverging lenses comprises a light incident surface, a light output surface, and a peripheral surface, the light incident surface and the light output surface are positioned at opposite sides of the diverging lens, the peripheral surface is interconnected between the light incident surface and the light output surface, the light incident surface defines a cavity, the light output surface is outwardly curved, and the peripheral surface has a frosted region.

14. The backlight module of claim 13, wherein each of the diverging lenses is symmetric relative to an optical axis thereof, the cavity is symmetric relative to the optical axis and has a semi-elliptic section, the cavity comprises a circular opening, and a depth of the cavity is larger than the radius of the opening.

15. The backlight module of claim 6, wherein each of the light emitting devices further comprises a reflecting mirror for receiving and reflecting the collimated white light beams.

* * * * *